United States Patent
Gleixner

[15] 3,678,281
[45] July 18, 1972

[54] PHOTOELECTRIC SENSING DEVICE

[72] Inventor: Franz Gleixner, Munich-Pasing, Germany

[73] Assignee: Firma Erwin Sick, Waldkirch i. Br., Germany

[22] Filed: March 31, 1970

[21] Appl. No.: 24,161

[30] Foreign Application Priority Data

April 2, 1969 Germany .................... P 19 17 139.2

[52] U.S. Cl. .................... 250/216, 250/202, 250/239
[51] Int. Cl. .................... H01j 5/16
[58] Field of Search .................... 250/200, 202, 216, 239; 350/247, 252

[56] References Cited

UNITED STATES PATENTS

| | | | |
|---|---|---|---|
| 2,952,778 | 9/1960 | Henderson | 250/239 |
| 2,331,337 | 10/1943 | Meyer | 250/202 |
| 3,255,047 | 6/1966 | Escoffery | 250/239 |
| 3,350,234 | 10/1967 | Ule | 250/239 |
| 2,933,612 | 4/1960 | Cheverton | 250/202 |
| 3,037,888 | 6/1962 | Lobosco | 250/202 |
| 3,278,750 | 10/1966 | Eissfeldt | 250/202 |
| 3,473,157 | 10/1969 | Little | 250/202 |

Primary Examiner—James W. Lawrence
Assistant Examiner—D. C. Nelms
Attorney—Darbo, Robertson & Vandenburgh

[57] ABSTRACT

In a photoelectric sensing device a first lens is affixed to a machine at a distance equal to its focal length from an object under observation. A detector unit, including a second lens and a photoelectric detector in the focal point thereof is resiliently mounted on a machine, the second lens being aligned with the first lens. Thereby the object is imaged on the detector regardless of vibrations of the machine and, on the other hand, the detector unit is protected from such vibrations.

4 Claims, 1 Drawing Figure

PATENTED JUL 18 1972
3,678,281
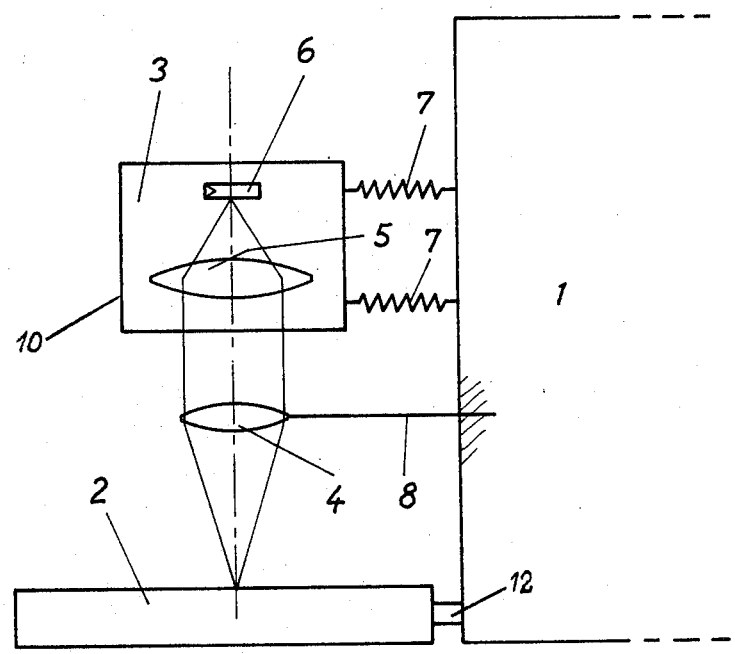
INVENTOR:
FRANZ GLEIXNER
BY
Darbo, Robertson &
Vandenburgh

PHOTOELECTRIC SENSING DEVICE

BACKGROUND AND SUMMARY OF THE INVENTION

This invention relates to a photoelectronic sensing device adapted to be affixed to a machine comprising: a member susceptible to vibrations and an imaging optical system for mutually imaging the said member and an object to be observed on each other.

It is conventional technique to control machines by means of photoelectronic sensing devices which are adapted to follow a pattern, such as a trace of a drawing, by photoelectronic sensing, the signals thus obtained controlling the machine. Such photoelectronic sensing devices are, for example, used to control milling or shaping machines, lathes, engraving machines planing machines or similar machine tools, welding machines and the like. Heavy vibrations occur often in these machines. Such vibrations are likely to damage delicate elements of the photoelectronic sensing device, such as incandescent lamps or electronic and precision mechanical parts. In order to protect the photoelectronic sensing device, it would be advisable to suspend it resiliently. If, however, the sensing device as a whole would be suspended resiliently, the measurement would become inaccurate, as there would be no unambiguous positional relation between the sensing device and the object under observation (or a support therefor).

It is an object of the invention to provide a photoelectronic sensing device in which a member susceptible to vibrations (such as a lamp or a photoelectronic detector with its connections and associated elements) is resiliently supported or suspended.

A more specific object of the invention is to provide a photoelectronic sensing device of this type in which, in spite of the resilient supporting of the member susceptible to vibrations, a particular spot in fixed spatial relation to the machine is imaged on said member regardless of machine vibrations.

In accordance with the invention a device of the type mentioned is provided, wherein the said optical system comprises a first imaging optical element having an optical axis and a second imaging optical element having an optical axis, said first optical element being mounted in fixed spatial relation to said machine at a distance from the location of said object equal to the focal length of said first optical element, and wherein part of the sensing device including said second optical element of the imaging optical system and said member are resiliently suspended with respect to said machine, the optical axes of said first and second optical elements being at least parallel to each other and the said member being held in the focal point of said second optical element in fixed positional relation thereto.

Thus the spot under observation will be imaged in infinity by said first optical element. The second optical element focuses the light beam on the said member, for example photoelectronic detector. This is done regardless of the small translatory relative movements between spot under observation and detector or the like.

An embodiment of the invention is described hereinbelow with reference to the accompanying drawing which is a side elevational view of a photoelectronic sensing device of the invention showing the elements and details to the extent necessary for the understanding of the invention.

DETAILED DESCRIPTION OF SPECIFIC EMBODIMENT

Reference numeral 1 designates part of a machine tool, to which a photoelectronic sensing device 10 is attached. The object under observation such as a drawing with a trace or pattern to be followed by the sensing device is affixed to object support 2. Machine part 1 and object support 2 are movable relative to each other but are connected to conventional formclosed guide means 12. Either object support 2 is stationary and part 1 with attached sensing device 10 will be moved to follow the trace under observation, or the object support 2 is moved with the trace past the stationary sensing device. The unambiguous positional relation between the part 1 and the sensing device 10 is determined, for example, by the position of servo motors (not shown) which move the elements mentioned. Sensing device 10 comprises a first lens 4 and a detector unit 3. Detector unit 3 comprises second lens 5 and photoelectronic detector 6 such as a photo diode. The first lens 4 is rigidly connected with machine part 1 as indicated at 8. The surface of the object support 2 is in the focal plane of the first lens 4, whereby the spot under observation on object support 2 is imaged in infinity. Lenses 4 and 5 form an imaging optical system by which a spot on object support 2 (or of an object thereon) is imaged on photoelectronic detector 6.

Lens 5 and photoelectronic detector 6 are resiliently attached to machine part 1, as indicated by springs 7 in the drawing. The optical axis of lens 5 is parallel to or aligned with that of lens 4. Thus lens 5 forms an image of the spot under observation in the plane of the photoelectronic detector 6. Additional photoelectronic and precision mechanical elements are located in unit 3 but have not been shown for clarity.

The latter imaging of the spot under observation is not affected by the location of the light beam falling on lens 5 but only by the angle of the incident rays. Shifting of lens 5 in the three translatory degrees of freedom will not result in any shift of the spot under observation. Thus if the lens 5 with the whole detector unit 3 is suspended resiliently in such a manner as to avoid rotation of the optical axis of lens 5 with respect to that of lens 4, the detector unit 3 of the sensing device 10 is shielded from vibrations of the machine without impairing the accuracy of the measurement, as there is an unambiguous positional relation between the spot under observation and the image thereof.

Preferably the aperture of lens 5 should be larger than that of lens 4, in order to make sure that also spots of the object under observation outside the focal point of the lens 4 will again be imaged. Therefore the distance between the two lenses should preferably be small.

Although the invention has been described for clarity in conjunction with a specific type of photoelectronic sensing device, the invention is not limited to this particular use. Rather can the invention be used with advantage in various other photoelectronic sensing devices such as, for example, in photoelectronic weft bobbin feelers.

What I claim is:

1. A photoelectronic sensing device adapted to be affixed to a machine comprising: a member susceptible to vibrations and an imaging optical system for mutually imaging the said member and an object to be observed on each other, wherein the said optical system comprises a first imaging optical element having an optical axis and a second imaging optical element having an optical axis, said first optical element being mounted in fixed spatial relation to said machine at a distance from the location of said object equal to the focal length of said first optical element, and wherein part of the sensing device including said second optical element of the imaging optical system and said member are resiliently suspended with respect to said machine, the optical axes of said first and second optical elements being at least parallel to each other and the said member being held in the focal point of said second optical element in fixed positional relation thereto.

2. A photoelectronic sensing device as claimed in claim 1 wherein said member susceptible to vibrations is a photoelectronic detector.

3. A photoelectronic sensing device as claimed in claim 2 wherein said second optical element has a larger aperture than said first optical element.

4. In an apparatus for a machine subject to vibration and employed in conjunction with an object spaced from the machine wherein the apparatus comprises a photoelectronic element and light transmission means for conducting light along a path extending between the element and the object, the improvement comprising:

a holder resiliently mounted on said machine, said element being attached to said holder; and said means including a first lens fixedly connected to said machine and positioned with its focal point on said object, and
a second lens attached to said holder and positioned with its focal point on said element.

* * * * *